US011138636B2

(12) United States Patent
Ta et al.

(10) Patent No.: US 11,138,636 B2
(45) Date of Patent: *Oct. 5, 2021

(54) MOBILE MEDIA WALLSCAPE PROJECTOR

(71) Applicant: Productive Application Solutions, Inc., Sheridan, WY (US)

(72) Inventors: Peter Ta, Tucson, AZ (US); Gerald Maliszewski, San Diego, CA (US); Edward Manolos, Los Angeles, CA (US)

(73) Assignee: Productive Application Solutions, Inc., Sheridan, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/316,411

(22) Filed: May 10, 2021

(65) Prior Publication Data

US 2021/0264473 A1     Aug. 26, 2021

Related U.S. Application Data

(60) Division of application No. 17/133,722, filed on Dec. 24, 2020, now Pat. No. 11,055,743, which is a
(Continued)

(51) Int. Cl.
*G06Q 30/00*     (2012.01)
*G06Q 30/02*     (2012.01)

(52) U.S. Cl.
CPC ..... *G06Q 30/0266* (2013.01); *G06Q 30/0244* (2013.01); *G06Q 30/0252* (2013.01); *G06Q 30/0267* (2013.01)

(58) Field of Classification Search
CPC .......... G06Q 30/0244; G06Q 30/0252; G06Q 30/0267
(Continued)

(56) References Cited

U.S. PATENT DOCUMENTS 4,259,660 A * 3/1981 Oliver ................. B60Q 1/2611
116/40
6,971,070 B2 * 11/2005 Obradovich .......... B60W 50/14
715/835
(Continued)

FOREIGN PATENT DOCUMENTS

FR      2578996 A1 *  9/1986  ............. G09F 21/04
GB      2402254 A  * 12/2004  ........... G06Q 20/127
(Continued)

OTHER PUBLICATIONS

Jingbin Liu et al. iParking: An Intelligent Indoor Location-Based Smartphone Parking Service. (Oct. 31, 2012). Retrieved online Aug. 26, 2020. https://www.ncbi.nlm.nih.gov/pmc/articles/PMC3522932/ (Year: 2012).*

(Continued)

*Primary Examiner* — James A Reagan
(74) *Attorney, Agent, or Firm* — Law Office of Gerald Maliszewski; Gerald Maliszewski

(57)     ABSTRACT

A mobile media projector system is provided with a chassis, configured for attachment to a mobile platform, having a screen deployment mechanism. A viewing screen is selectively deployable when the mobile platform is parked in a stationary geographic location. An imaging projector subsystem projects an image onto the deployed viewing screen. Typically, the chassis is configured for attachment to an automotive vehicle with a roof, and the viewing screen is deployed over an exterior surface of the automotive vehicle. The system may include a WLAN and/or WPAN access point. A targeting application may select the geographic location from a group of stationary geographic locations, each having a weighted value. A second mobile media projector system includes a chassis configured for attachment to a roof of an automobile having a side mirror. An
(Continued)

image projected onto the side mirror is reflected onto a surface such as the automobile door.

9 Claims, 8 Drawing Sheets

Related U.S. Application Data continuation-in-part of application No. 17/097,256, filed on Nov. 13, 2020, which is a continuation-in-part of application No. 17/071,043, filed on Oct. 15, 2020, now Pat. No. 11,037,199, which is a continuation-in-part of application No. 17/023,546, filed on Sep. 17, 2020, now Pat. No. 10,991,007, which is a continuation-in-part of application No. 17/007,575, filed on Aug. 31, 2020, which is a continuation of application No. 16/869,696, filed on May 8, 2020, now Pat. No. 10,803,488, which is a continuation of application No. 16/601,362, filed on Oct. 14, 2019, now Pat. No. 10,796,340.

(60) Provisional application No. 62/779,972, filed on Dec. 14, 2018.

(58) Field of Classification Search
USPC .......... 705/14.63, 14.62, 14.49, 14.4; 725/32
See application file for complete search history.

(56) References Cited

U.S. PATENT DOCUMENTS

| | | | | |
|---|---|---|---|---|
| 7,347,017 | B2* | 3/2008 | Shaffer, Jr. | G09F 21/04 296/21 |
| 9,076,336 | B2* | 7/2015 | Tippelhofer | G08G 1/148 |
| 9,939,287 | B2* | 4/2018 | Castellucci | G01C 21/3476 |
| 10,382,579 | B2* | 8/2019 | Mevissen | H04L 67/306 |
| 10,482,766 | B2* | 11/2019 | Mowatt | G08G 1/144 |
| 10,733,891 | B2* | 8/2020 | Chow | G08G 1/04 |
| 2002/0009978 | A1* | 1/2002 | Dukach | G08G 1/01 455/99 |
| 2006/0265922 | A1* | 11/2006 | Shaffer, Jr. | G09F 21/048 40/591 |
| 2009/0084009 | A1* | 4/2009 | Vandergriff | G09F 13/18 40/546 |
| 2011/0131235 | A1* | 6/2011 | Petrou | G06F 16/532 707/769 |
| 2012/0245966 | A1* | 9/2012 | Volz | G06Q 10/02 705/5 |
| 2013/0307706 | A1* | 11/2013 | Kriezman | B60Q 1/503 340/988 |
| 2014/0214319 | A1* | 7/2014 | Vucetic | G01C 21/3446 701/533 |
| 2014/0309865 | A1* | 10/2014 | Ricci | G06F 3/0481 701/36 |
| 2015/0123818 | A1* | 5/2015 | Sellschopp | G08G 1/096816 340/932.2 |
| 2015/0254721 | A1* | 9/2015 | Rad | G06Q 30/0266 705/14.63 |
| 2015/0279210 | A1* | 10/2015 | Zafiroglu | G08G 1/065 340/932.2 |
| 2016/0116293 | A1* | 4/2016 | Grover | G01C 21/34 701/23 |
| 2016/0191879 | A1* | 6/2016 | Howard | H04N 9/3147 348/745 |
| 2016/0292744 | A1* | 10/2016 | Strimaitis | G06Q 30/0269 |
| 2017/0132960 | A1* | 5/2017 | Kis-Benedek Pinero | G06F 1/1637 |
| 2017/0309170 | A1* | 10/2017 | Wang | G08G 1/146 |
| 2018/0186309 | A1* | 7/2018 | Batten | B60Q 1/56 |
| 2018/0186311 | A1* | 7/2018 | Mason | B60R 21/01 |
| 2019/0121522 | A1* | 4/2019 | Davis | G06F 3/04815 |
| 2019/0135180 | A1* | 5/2019 | Watatsu | B60R 1/00 |
| 2021/0001724 | A1* | 1/2021 | Dobashi | B60K 35/00 |

FOREIGN PATENT DOCUMENTS

| | | | | | |
|---|---|---|---|---|---|
| JP | | 2010026474 A | * | 2/2010 | .......... G09F 21/048 |
| JP | | 2018072077 A | * | 5/2018 | ............ G01S 19/14 |
| JP | | 2018205399 A | * | 12/2018 | ............ G09F 21/04 |
| WO | WO-2008135617 A1 | | * | 11/2008 | .......... G08G 1/0175 |

OTHER PUBLICATIONS

Ted Morris et al. A Comprehensive System for Assessing Truck Parking Availability Final Report. (Jan. 2017). Retrieved online Aug. 26, 2020. https://www.dot.state.mn.us/ofrw/PDF/assessing-truck-parking.pdf (Year: 2017).*
Mateusz Jozef Kulesza. E-Park: Automated-Ticketing Parking Meter System. (Apr. 2, 2015). https://dash.harvard.edu/bitstream/handle/1/17417570/KULESZA-SENIORTHESIS-2015.pdf?sequence=1&isAllowed=y (Year: 2015).*
Florian Alt. A Design Space for Pervasive Advertising on Public Displays. (Jul. 12, 2012). Retrieved online Aug. 13, 2020. https://pdfs.semanticscholar.org/4bef/aba88eb1d14e81dcd610658bccbbf287b770.pdf (Year: 2012).*
Ben Coxworth. Truck-mounted billboards morph with the miles. (Sep. 12, 2016). Retrieved online Aug. 13, 2020. https://newatlas.com/roadads-eink-truck-billboards/45380/ (Year: 2016).*
Technoframe. LED Bus Screens. (Nov. 18, 2011). Retrieved online Aug. 13, 2020. https://technoframe.com/led-bus-screens (Year: 2011).*
Technobob. MMOV Takes Projection Mapping on the Road. (May 11, 2011). Retrieved online Jul. 11, 2021. https://technabob.com/blog/2011/05/11/mmov-projection-mapping-vehicle/ (Year: 2011).*
The Graffiti Research Lab. Projection Bombing. (circa 2008). Retrieved online Jul. 11, 2021. https://www.instructables.com/PROJECTION-BOMBING/ (Year: 2008).*
Projectable Objects. Tutorial: The Easier Way to Projection Map for Advertisement on a Building. (Oct. 13, 2014). Retrieved online Jul. 11, 2021. https://projectileobjects.com/2014/10/13/the-easier-way-to-projection-map-for-advertisement-tutorial/ (Year: 2014).*
Parker, Phillip, "The 2018-2023 World Outlook for Outdoor Advertising", 2017 ICON Group International.

* cited by examiner

MOBILE MEDIA WALLSCAPE PROJECTOR

RELATED APPLICATIONS

Any and all applications, if any, for which a foreign or domestic priority claim is identified in the Application Data Sheet of the present application are hereby incorporated by reference under 37 CFR 1.57.

BACKGROUND OF THE INVENTION

1. Field of the Invention

This invention generally relates to media presentation and, more particularly, to a system and method for using projector images to present media from a mobile platform.

2. Description of the Related Art

Market research shows that outdoor billboard marketing space has increasingly become harder to find and, hence, more valuable. At the same time, automotive vehicles are one of the most costly expenses incurred by the average consumer. Ironically, most automobiles sit idle for a large portion of the day. U.S. Pat. No. 10,796,340, entitled SYSTEM AND METHOD FOR TARGETING THE DISTRIBUTION OF MEDIA FROM A MOBILE PLATFORM, invented by Peter Ta et al., and filed on Oct. 14, 2019, addresses to problem of finding more outdoor advertising space by providing an automotive targeted parking system that adds to an automobile the additional feature of a media display subsystem, and which may also include a Wireless Local Area Network (WLAN) IEEE 802.11 (WiFi) access point (hotspot).

It would be advantageous if an automobile could be used as portable real estate, capable of projecting media and acting as a communications center.

It would be advantageous if the media presented was visible at night.

It would be advantageous if the parking locations of the media presentations could be monitored.

It would be advantageous if Wireless Local Area Network (WLAN) and Wireless Personal Area Network (WPAN) services could be simultaneously provided and monitored.

SUMMARY OF THE INVENTION

A system and method are disclosed herein for automotive vehicle positioning, for use in providing Wireless Local Area Network (WLAN) IEEE 802.11 (WiFi) and Wireless Personal Area Network (WPAN) access points, together with media projection services. Thus, the system may act as a mobile advertising platform that seeks to expand and capture market share within the outdoor advertising market segment by directing the selective deployment of media and WLAN/WPAN services to preferred target locations. Advantageously, the media is presented using a projector (e.g., liquid crystal (LC) or light emitting diode (LED) display), making the media visible at night. The system may transmit the following information: (i) a unique identifier for the device in use (for example, radio-frequency identification), (ii) the time, date, duration, and location (using global positioning satellite (GPS) or cellular triangulation systems), (iii) an indication that the media projection subsystem has been deployed, and (iv) an indication that the WLAN/WPAN access point is in use. Graphic information system (GIS) mapping technology may be used to compensate a person or business entity associated with the system for operating in specified locations. One of the primary features of the system its ability to determine if a vehicle is temporarily at rest or parked in a stationary location.

Accordingly, a mobile media projector system is provided with a chassis, configured for attachment to a mobile platform, having a screen deployment mechanism. A viewing screen is selectively deployable by the screen deployment mechanism when the mobile platform is parked in a stationary geographic location. An imaging projector subsystem is selectively engageable to project an image onto the deployed viewing screen. Typically, the chassis is configured for attachment to an automotive vehicle with a roof, and the viewing screen is deployed over an exterior surface of the automotive vehicle. A memory embedded with the chassis may be a non-transitory memory to store projector imaging data, a random-access memory to relay streaming image data, or both. In one aspect, the system includes a WLAN and/or WPAN access point, configured for attachment to the chassis.

The image projector subsystem includes an extension, which may be a hood, or one or more struts, having a proximal end attached to the chassis and a distal end extending over an automotive vehicle roof edge. In this case, an image projector (e.g., LC or LED display) is attached to the distal end. In one aspect, the viewing screen is made up of a lower section and an upper section to receive the projected image. Typically, the viewing screen lower section displays a fixed, non-transitory image, and the upper section displays a projected transitory active image (e.g., a video). With one option, when the media projector subsystem is not enabled or when the mobile platform is in motion, the distal end of the extension is retractable, away from the roof edge.

In another aspect of the system, the imaging projector subsystem supplies an enablement signal when engaged and the system further includes a location subsystem, configured for attachment to the chassis, to determine a geographic location of the chassis. A communications subsystem, configured for attachment to the chassis, has an interface to receive verification information including the imaging projector subsystem enablement signal and the geographic location. The communications subsystem may store the verification information in local memory, or if the communications subsystem is a wireless transceiver, it may transmit the verification information.

In one aspect, the system also includes a targeting subsystem for selecting the geographic location from a group of stationary geographic locations, each having a weighted value. A reward subsystem may determine a reward in response to the stationary geographic location weighted value. The system may also include a camera, configured for attachment to the chassis, having an output to supply images of a geographic location proximate to the chassis, which are then accepted by the communications subsystem. In one aspect of the system, the viewing screen is not used, and instead, the projector image is formed on an adjacent vertical wall to create a wallscape.

A second mobile media projector system is presented including a chassis configured for attachment to a roof of an automobile having a side mirror. An imaging projector subsystem is selectively engageable to project an image on the side mirror, and the image is reflected by the side mirror onto a surface such as a vertical exterior surface of the automobile (e.g., door), a sidewalk located adjacent to the automobile, or a wall located adjacent to the automobile.

As in the system above, this system may include a location subsystem, configured for attachment to the chassis, to determine a geographic location of the chassis, and a communications subsystem, configured for attachment to the chassis, having an interface to receive verification information including an enablement signal generated when the automobile is stationary in a geographic location. Further, a targeting subsystem may be used for determining the stationary geographic location selected from a plurality of stationary geographic locations, each having a weighted, and optionally, rewarded value.

A mobile communications system is also presented with a media projection topper, configured for attachment to a roof of the vehicle, having display side panels to project media. This system includes a motion detection subsystem, configured for attachment to the media projection subsystem, to determine when the vehicle is stationary in a geographic location, and to determine the duration of time the vehicle is stationary. A communications subsystem, as described above, is configured for attachment to the media projection subsystem, and has an interface to receive verification information including an enablement signal generated when the vehicle is stationary. As in the system described above, a location subsystem may be configured for attachment to the media projection topper, to determine a geographic location of the vehicle, which information is passed to the communications subsystem. In one aspect, the motion detection subsystem is the location subsystem.

Also as above, the system may include a targeting subsystem for determining the stationary geographic location selected from a plurality of stationary geographic locations, each having a weighted value that may be rewarded. In one aspect, a reward is determining in response to the determined stationary durations of time.

Additional details of the above-described systems are provided below.

DETAILED DESCRIPTION

Figure 1:
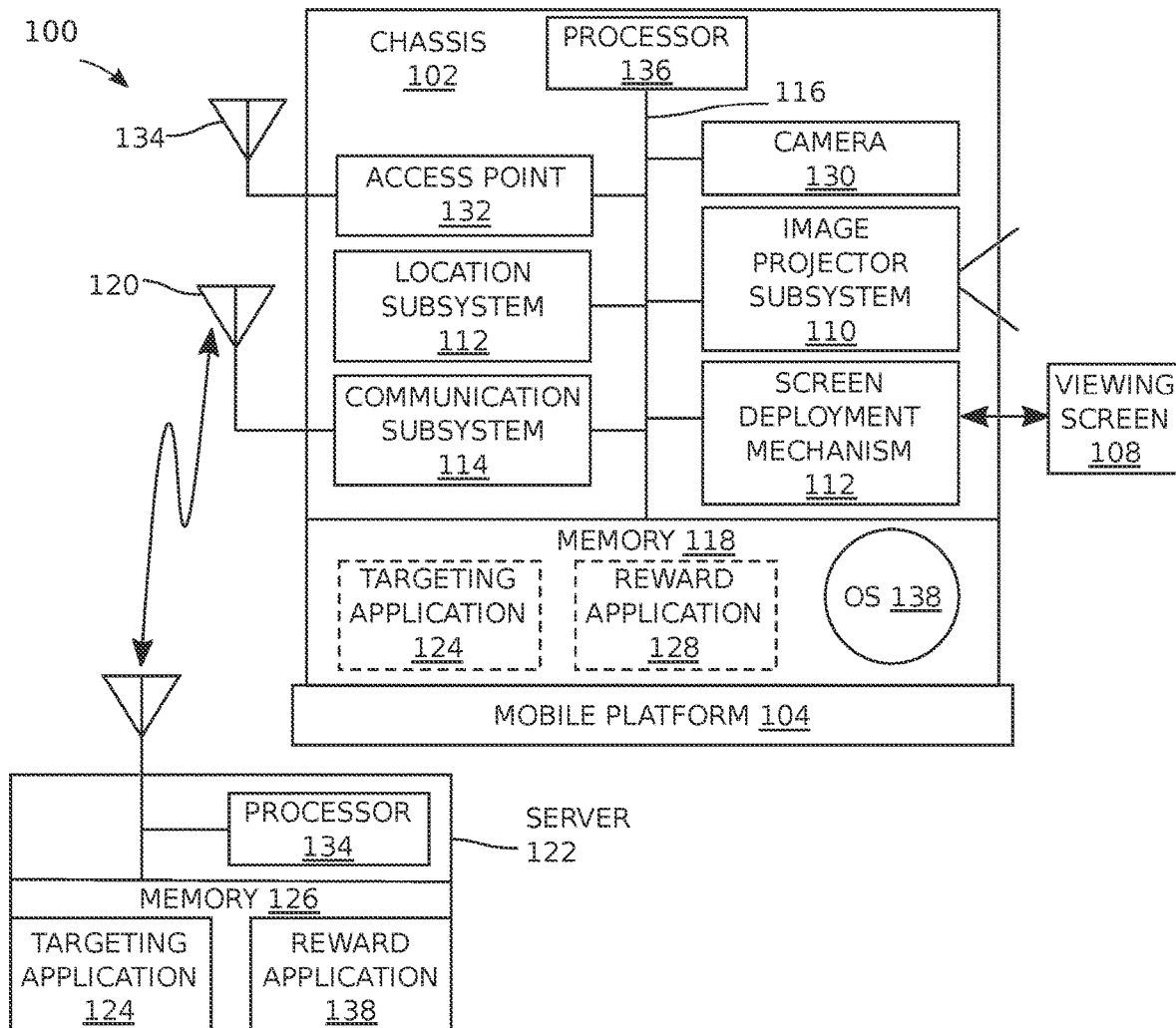
FIG. 1 is a schematic block diagram of a mobile media projector system.

FIG. 1 is a schematic block diagram of a mobile media projector system. The system 100 comprises a chassis 102, configured for attachment to a mobile platform 104, comprising a screen deployment mechanism 106. The chassis 102 may include components for attaching to the mobile platform 104. The chassis 102 may also include an internal battery and/or cables for attachment to an external power source. The chassis typically includes miscellaneous electronic circuitry required to support the major components described below, as would well understood in the art. For example, the screen deployment mechanism wraps and unwrap a flexible screen material around a roller. However, the system 100 is not limited to any particular type of screen material or deployment means. Some common examples of a mobile platform include an automotive vehicle, scooter, truck, a towed trailer, or portable objects that a small enough to be moved without wheels, (e.g., a sidewalk sign). A viewing screen 108 is selectively deployable by the screen deployment mechanism when the mobile platform 104 is parked in a stationary geographic location. Typically, the viewing screen cannot safely be deployed unless the mobile platform is stationary. An imaging projector subsystem 110 is selectively engageable to project an image onto the deployed viewing screen 108. The imaging projector subsystem 110 may also broadcast audio messages.

Figure 2A:
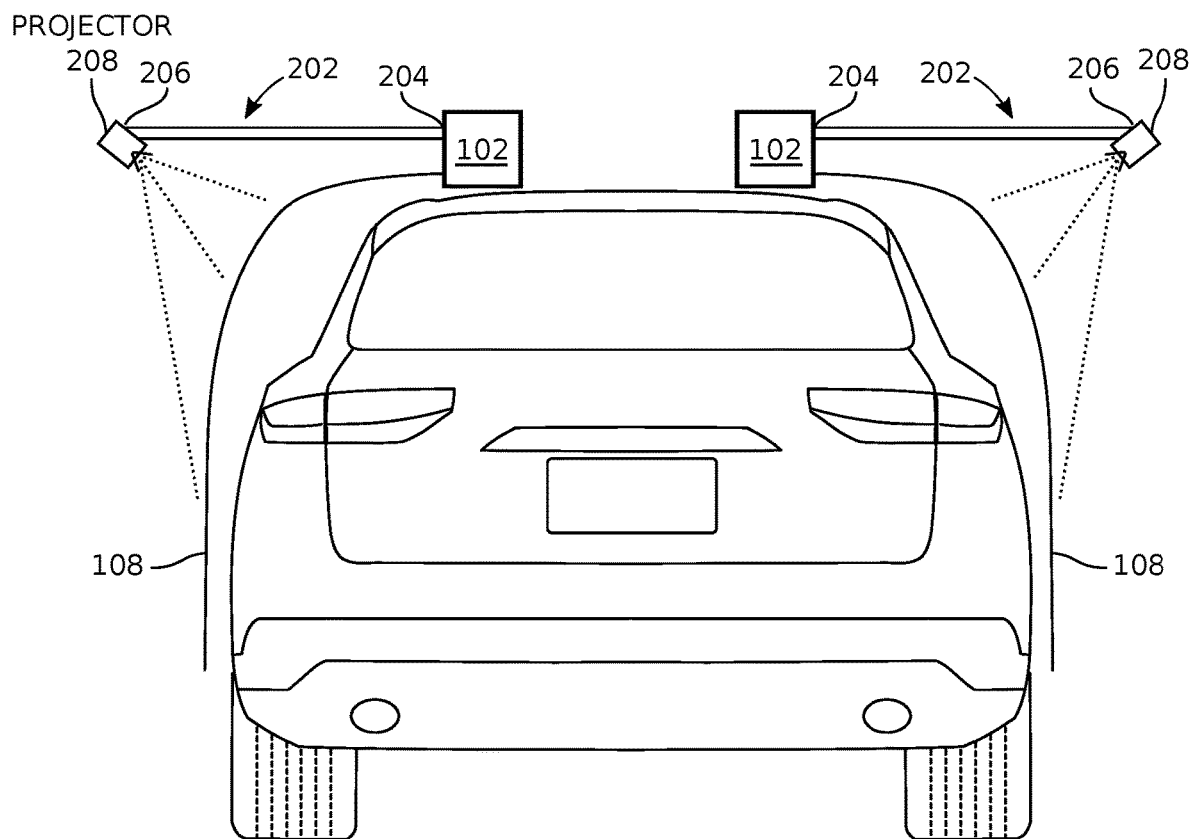
FIGS. 2A through 2C depict exemplary viewing screen deployment options.
Figure 2B:
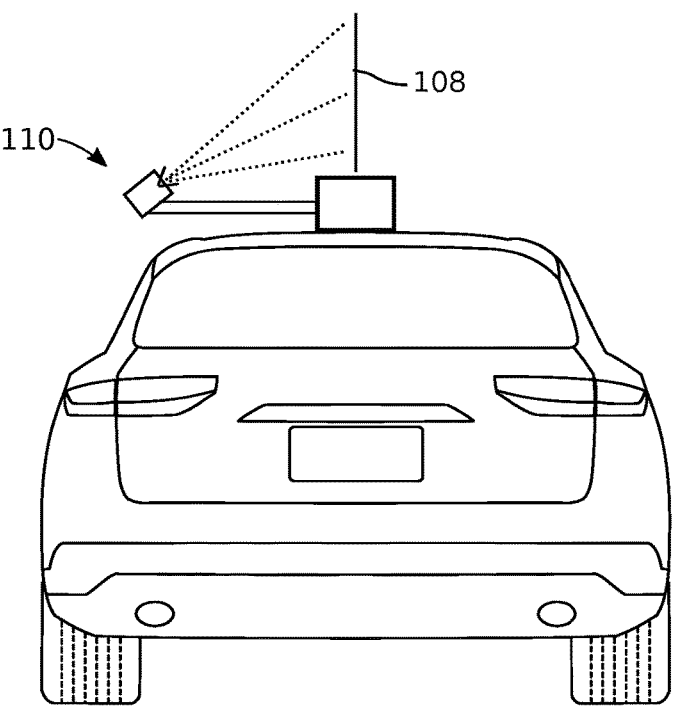
Figure 2C:
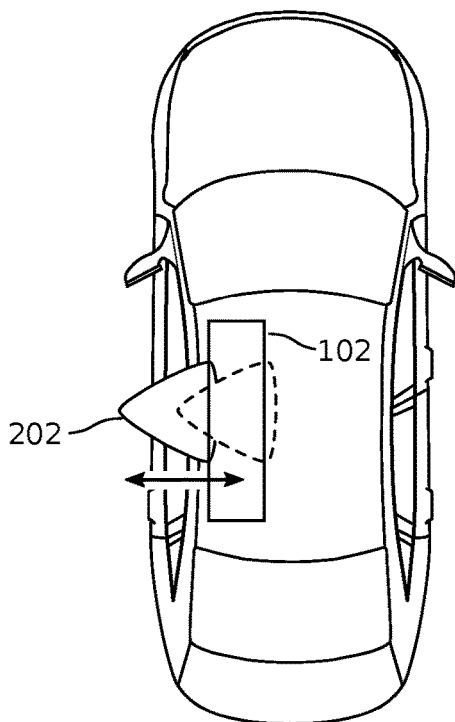

FIGS. 2A through 2C depict exemplary viewing screen deployment options. Here, the chassis 102 is configured for attachment to the roof of an automotive vehicle 200. In FIG. 2A the viewing screen 108 is deployed over an exterior surface (e.g., door) of the automotive vehicle 200. However, it should be understood that the viewing screen may, alternatively, be deployed over other exterior surfaces (e.g., front or back). Here, two chasses are shown with associated projector subsystems, with screens overlying driver and passenger side doors. However, the system is not limited to any particular number of chasses, with supporting subsystems. In FIG. 2B the viewing screen 108 extends as a popup, vertically from a substantially planar horizontal roof. Alternatively but not shown, the imaging projector subsystem may project images on both sides of the popup viewing screen, or more than one chassis/viewing screen/imaging projector subsystem may be attached to the roof.

As shown in FIG. 2A, the image projector subsystem comprises an extension 202 having a proximal end 204 attached to the chassis 102 and a distal end 206 extending over an automotive vehicle roof edge. The image projector subsystem includes an image projector 208 attached to the distal end 206. For example, the image projector 208 may be a liquid crystal (LC) and light emitting diode (LED) display similar to a home theater type video projector. Alternatively, high performance (e.g., mercury arc or xenon arc) lamps, cathode ray tube (CRT), digital light processing (DLP), plasma, silicon X-tal reflective display (SXRD), or red-green-blue (RGB) lasers may be used. The extension 202 may be enabled as a hood (see FIG. 2C), but alternatively, it may be comprised of one or more struts. Note, in the case of vertically extending popup screen (FIG. 2B), the extension distal end need not necessary extend over the roof edge.

In one aspect, as shown in the plan top-down view of FIG. 2C, the extension 202 (shown here as a hood) is retractable (as shown in phantom), away from the roof edge. Here, the viewing screen has been retracted and the extension hood 202 is pulled into the chassis 102. Alternatively but not shown, the hood is flipped up so that the distal end is vertically orientated over the proximal end.

Figure 3A:
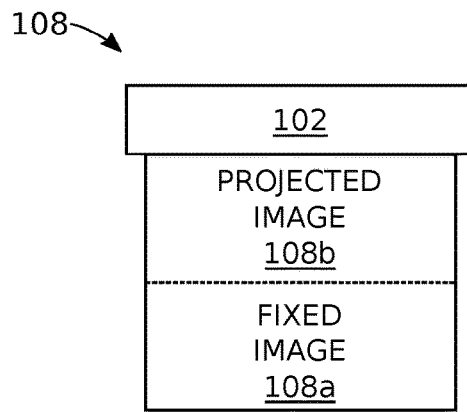
FIGS. 3A and 3B depict exemplary viewing screen variations.
Figure 3B:
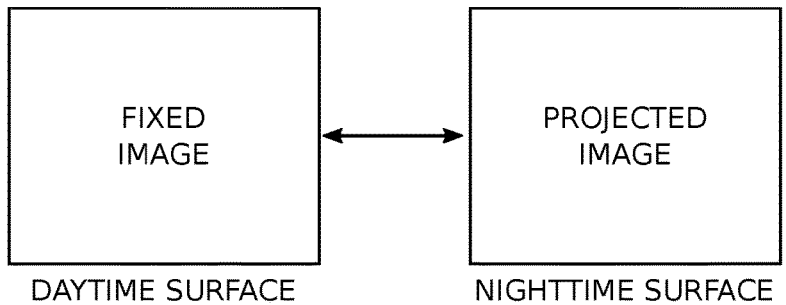

FIGS. 3A and 3B depict exemplary viewing screen variations. In one aspect, the projected image covers the entire surface of the viewing screen. Alternatively, as shown in FIG. 3A, the viewing screen 108 comprises a lower section 108a and an upper section 108b to receive the projected image. The viewing screen lower section 108a displays a fixed, non-transitory image. For example, a message may be printed on the screen. Alternatively, the screen lower section 108a may include embedded LEDs to help light a fixed, non-transitory (passive) image, or to create a transitory active (moving) image. In this variation, the viewing screen upper section 108b displays a projected transitory active image, such as a video.

In one aspect, the viewing screen is reversible, having a daytime surface, shown in FIG. 3B to display a non-transitory passive image, and a nighttime surface to display an image projected by imaging projector subsystem. In one aspect, the daytime surface may include embedded LEDs, in which case the image created on the screen may include some transitory features. In the example of FIG. 3B, the nighttime surface is entirely reserved for the projected image.

Returning the FIG. 1, the system 100 may further comprise a location subsystem 112, configured for attachment to the chassis 102, to determine a geographic location of the chassis. Examples of a location subsystem 112 include a Global Positioning Satellite (GPS) system receiver, assisted GPS taking advantage of cell tower data, a Wireless Local Area Network IEEE 802.11 (WiFi) positioning system, cell-site multilateration, satellite multilateration, inertial system, or a hybrid positioning system. Hybrid positioning systems find location using several different positioning technologies, such as GPS, combined with cell tower signals, wireless internet signals, Bluetooth sensors, IP addresses, and network environment data. Cell tower signals have the advantage of not being hindered by buildings or bad weather, but usually provide less precise positioning. WiFi positioning systems may give very exact positioning in urban areas with high WiFi density, depending on a comprehensive database of WiFi access points. Further, a LORAN type system or LoJack® type system might be adapted for the purpose of location determination. As noted in U.S. Pat. No. 10,796,340, which is incorporated herein by reference, camera images and the location data of proximate smartphones, laptops, and personal communication devices can also be used to determine location.

The system 100 may also comprise a communications subsystem 114 configured for attachment to the chassis 102. If the imaging projector subsystem 110 creates an enablement signal when it is enabled, a communications subsystem interface (i.e., bus) on line 116 may receive verification information including the imaging projector subsystem enablement signal and the geographic location. In one aspect, the communications subsystem 114 stores verification information in local memory 118, embedded with the chassis 102, for later recovery. The local memory 118 may be a non-transitory memory that is also capable of storing projector imaging data, or random-access memory to relay streaming image data, or both. The non-transitory memories described herein may be any type or form of non-volatile storage device or medium capable of storing data and/or other computer-readable instructions. Examples of memories include, without limitation, Read Only Memory (ROM), flash memory, or any other suitable memory device. Although not required, in certain embodiments, the system described herein may include both a volatile memory unit and a non-volatile storage device. The memory may be implemented as shared memory and/or distributed memory in a network device.

In some aspects, a chassis identification code can be extrapolated from an address associated with the communications subsystem 114, the location subsystem 112, or the mobile platform 104. Otherwise, the identification code is a code loaded into local memory 118, or alternatively it can be a mechanical device, such as a DIP switch.

Alternatively, the communications subsystem 114 is a wireless transceiver having an interface to antenna 120, to transmit the verification information to a central controller or administrator represented by server 122. The most typical examples of a communication subsystem are cellular systems (e.g., Global System for Mobile Communications (GSM), Universal Mobile Telecommunications System (UMTS)-time division duplexing (TDD), Long-Term Evolution (LTE), 4th Generation (4G), or 5th Generation (5G)), and the like. Less typically, the communications subsystem may be enabled with WLAN IEEE 802.11 (WiFi), or even Long Range Wireless transceiver. Some examples of a Long Range Wireless system include Digital Enhanced Cordless Telecommunications (DECT), Evolution-data Optimized (EVDO), General Packet Radio Service (GPRS), High Speed Packet Access (HSPA), IEEE 802.20 (iBurst), Multichannel Multipoint Distribution Service (MMDS), Muni WiFi, commercial satellite, and IEEE 802.16 Worldwide Interoperability for Microwave Access (WiMAX (WiBro)). As another alternative, the communication messages may be stored in the platform memory 118 and periodically downloaded using a wireless or hardwire connection. The system 100 is not limited to any particular type of communication subsystem.

In one aspect, the system 100 may comprise a targeting subsystem, shown here as a software application 124 stored in a non-transitory memory and enabled as a sequence of processor executable instructions for selecting the geographic location from a plurality of stationary geographic locations, each having a weighted value. The targeting application may be stored in local memory 118 (as shown in phantom), or in server memory 126. The system 100 may further comprise a reward subsystem shown here as a software application 128 stored in a non-transitory memory and enabled as a sequence of processor executable instructions for determining a reward in response to the stationary geographic location weighted value. The reward application 128 may be stored in local memory 118 (as shown in phantom), or in server memory 126. An entity receives the reward. As used herein, an "entity" may be a person, a business, a corporation, or any type of social organization or business unit able to claim ownership of, or association with, the identification code, chassis 102, system 100, mobile platform 104, server 122, or server clients.

In another aspect, the system 100 comprises a camera 130, configured for attachment to the chassis 102, having an output on line 116 to supply images of a geographic location proximate to the chassis. The communications subsystem 114 accepts the camera images and either stored them in local memory 118 for later recovery, or transmits them to the server 122 for storage in memory 126. In one aspect the camera 130 is directed towards the viewing screen 108. In this manner any distortion of the image caused as a result of the screen 108 presenting a non-planar or atypical surface can be corrected by the image projector subsystem 110, or by a server-based correction software application (not shown).

The camera images may also be used to modify the value of the target location. For example, the recorded traffic in a location may be greater than anticipated, and the target value adjusted accordingly. That is, images recording higher pedestrian or vehicular traffic may have greater value. The data may be used to help determine the efficacy of the media or location. Alternatively or in addition, the camera images my act to verify that the media projector subsystem has been enabled, the platform is stationary, or the platform is located in a particular location. In one aspect, simply recording a change in images, and thus proximate traffic, can be used as a means for proving media projector subsystem enablement. As an alternative, or in addition to the camera, the system may further comprise a proximity detector subsystem to sense nearby motion, to measure the density of proximate vehicular or foot traffic, which data is transmitted by the communications subsystem or recorded in local memory.

Figure 4A:
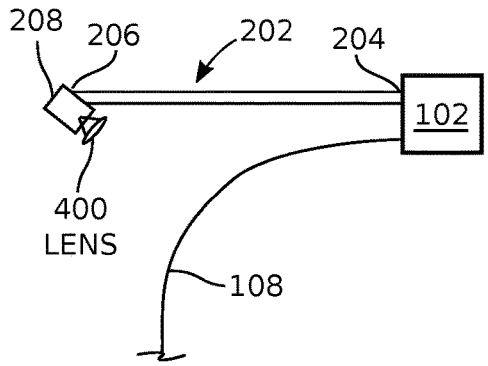
FIGS. 4A and 4B depict details of exemplary imaging projector subsystems.
Figure 4B:
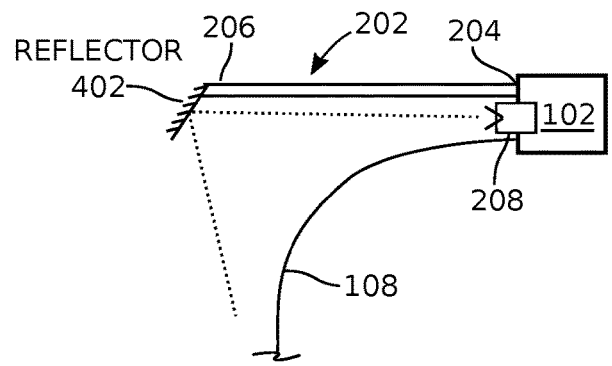

FIGS. 4A and 4B depict details of exemplary imaging projector subsystems. FIG. 4A depicts an image projector 208, as described above, supplying the projected image. In this example, the imaging projector subsystem also includes a lens 400 having an input aperture to receive the projected image and an output to supply a refracted image to the viewing screen. For example, the lens may be a "fish eye" type of lens that takes a relatively narrowly focused image and distributes the image or a significantly larger screen surface area. Such a lens is commonly used in home theater projector systems.

In FIG. 4B the image projector 208 is embedded with the chassis 102. As above, extension 202 has a proximal end 204 attached to the chassis 102 and a distal end 206 extending over an automotive vehicle roof edge. A reflector 402 attached to the distal end 206 receives the projected image and supplies a reflected image to the viewing screen.

Returning to FIG. 1, the system 100 may further comprise a publically accessible access point 132, configured for attachment to the chassis 102, and connected to antenna 134. The access point 132 may a wireless local area network (WLAN) IEEE 802.11 device, such as a WiFi hotspot, a wireless personal area network (WPAN), such a Bluetooth device or Bluetooth piconet, or it may include both WLAN and WPAN devices. Alternatively, but less common, the access point 132 may an IEEE 802.15.4 Zigbee, WPAN IEEE 802.15 Li-Fi or wireless USB device. Even more unlikely as an access point are Long Range Wireless systems. In the case of the WiFi hotspot being a component of the communications subsystem 114, items 114 and 132 might be collocated. In one aspect, the access point can be used to collect data from entities passing by, or engaging with the access point. This data can be stored in local memory 118 or transmitted to server 122.

As is common in many computer systems, a processor 136, which may include a peripheral interface, is connected to the bus line 116, to pull operating instructions from operating system (OS) 138 and software applications in memory 118, and manage communications between the various components of system 100. Likewise (see FIG. 6), server 122 would be enabled through the use of processor 140 and OS 142. For ease of understanding, the above-described functions have been described as individual components. However, it should be understood that in practice, multiple functions may be performed by a single device, subsystem, or software application.

In one aspect, the communications subsystem 114 receives media uploads (e.g., streaming data) from the server 122, and the communications subsystem 114 provides the media uploads to the media projector subsystem 110 for presentation. In other aspects, the memory, the location subsystem, communication subsystem, and/or the access point may be enabled in a smartphone, laptop computer, or personal device that can be interfaced with the chassis.

Figure 5:
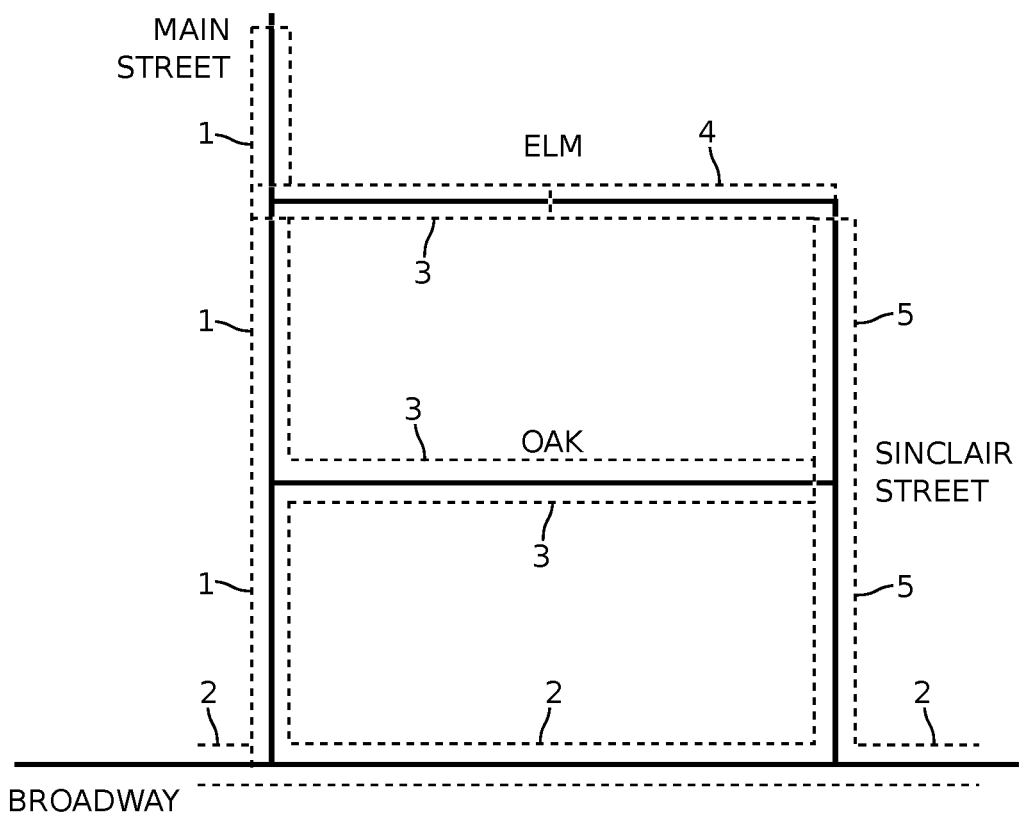
FIG. 5 is a plan view of geographic regions cross-referenced to the weighted value of various stationary positions.

FIG. 5 is a plan view of geographic regions cross-referenced to the weighted value of various stationary positions. As shown, regions along Main Street have a value of 1, the highest rated value. The regions along Broadway have a value of 2. The regions along Oak have a value of 3. The region along Elm near Main Street have a value of 3, which decreases to a value of 4 near Sinclair Street, and the regions along Sinclair Street have a value of 5.

Figure 6:
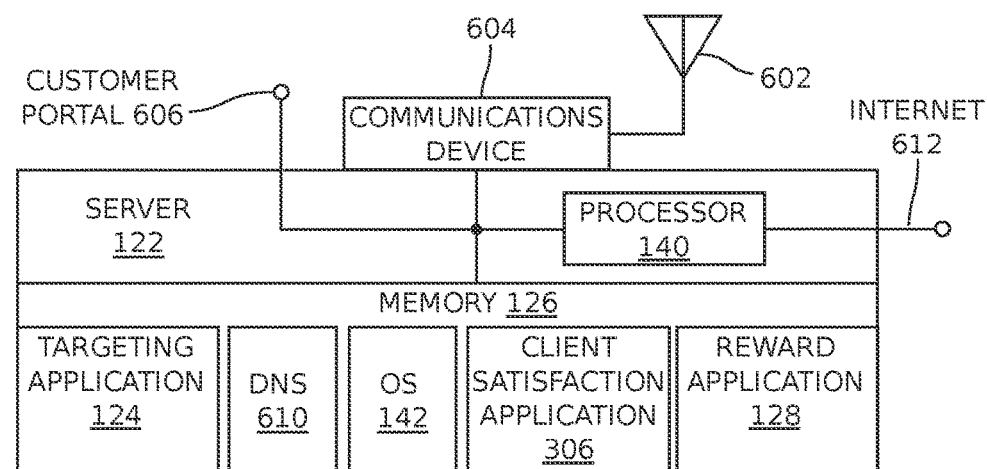
FIG. 6 is a schematic block diagram of the server depicted in FIG. 1.

FIG. 6 is a schematic block diagram of the server depicted in FIG. 1. For convenience, all the components associated with server 122 are shown embedded as a single schematic block, but it should be understood that these components are not necessarily embedded in a single hardware unit or server, or in communication with each other. Alternatively, the software applications may be cooperating components of an overall software system. As shown, the server 122 connected to antenna 602 through communications device 604, to receive the verification information, and other information from system (100, see FIG. 1). Although depicted as a wireless communications system, it should be understood that the linkage represented by the communication device may represent Internet and Ethernet linkages to cell tower base stations and cloud search engines, or any other means of communication, and may generally be referred to as portal. A second interface on line 606, also referred to as a customer portal, receives first client goals such target market, deployment hours, deployment rate, and positions to name a few examples. Otherwise, a client satisfaction software application 608, embedded in memory 126, includes processor instructions for determining the above-mentioned client goals. For example, the client satisfaction software application 608 may determine positions meeting the first client goals in response to factors such as location, local demographics, traffic, population density, length of deployment, and combinations thereof. An operating system 142 works in cooperation with the processor 140 to enable software applications in memory 126 and to process information to and from communications device 604. The second interface on line 606 also provides data to a client concerning system (100) media messages, locations, durations, and access point collected data. For example, if the access point (FIG. 1, 132) is WLAN IEEE 802.11 WiFi hotspot that accepts Uniform Resource Locator (URL) address requests from a user device (e.g., a smartphone), the URL address requests may be transmitted to a Domain Name System (DNS) service 610 embedded with server 122. The DNS service 610 makes address searches, if necessary, via the Internet interface on line 612.

In one example, the server 122 is associated with a second entity. Then, a server client provides a reward to the first and/or second entity when the media projection subsystem is enabled, but provides no reward to the first and/or second entity when the media projection subsystem is not enabled. Similarly, rewards to the first or second entities may be based upon the volume of traffic through the WiFi hotspot, the location of stationary parking spots, or access point data collected.

The systems described above can be adapted for use in a model where an advertiser or commercial entity pays for service based upon performance. For example, an advertising (server) client may contract with a system provider stipulating a target market and deployment hours/rate. The system provider (intermediary organization) determines geo-fenced locations that meet or exceed the advertiser's target market based on location, demographics, traffic, population density, and other variables. Platform deployment time, location, quality code, and user information are recorded by the server. A system provider algorithm determines platform performance based on length of deployment, contracted rate, maintenance cost reimbursement, and location quality code.

The systems described above support a targeted location system, where the mobile display or access point may be selectively deployed. In cooperation with the deployment of the display and/or access point, an organization or associated user is directed to preferred locations. For example, the deployment of the sign along a busy urban thoroughfare is likely to have a greater value than deployment on a suburban side-street. Other factors that may be used to calculate target value may include the time of day and the length of deployment. Thus, some key features to the system are determining that the display and/or access point have actually been deployed, and once deployed, the location of the system.

Figure 7A:
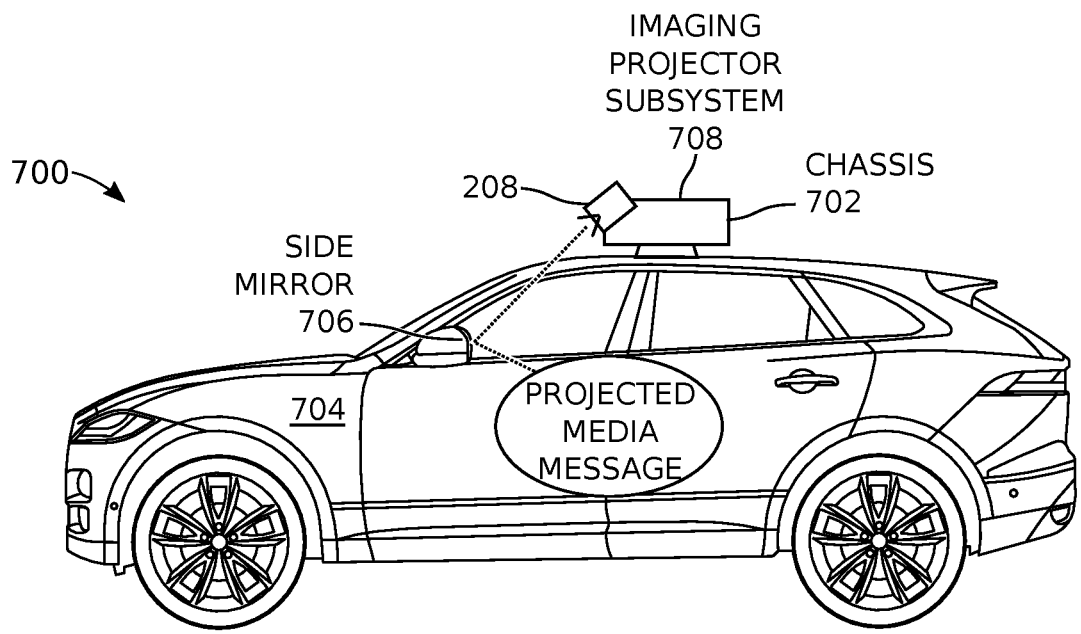
FIGS. 7A and 7B are, respectively, perspective and schematic block diagrams depicting a variation of the mobile media projector system.
Figure 7B:
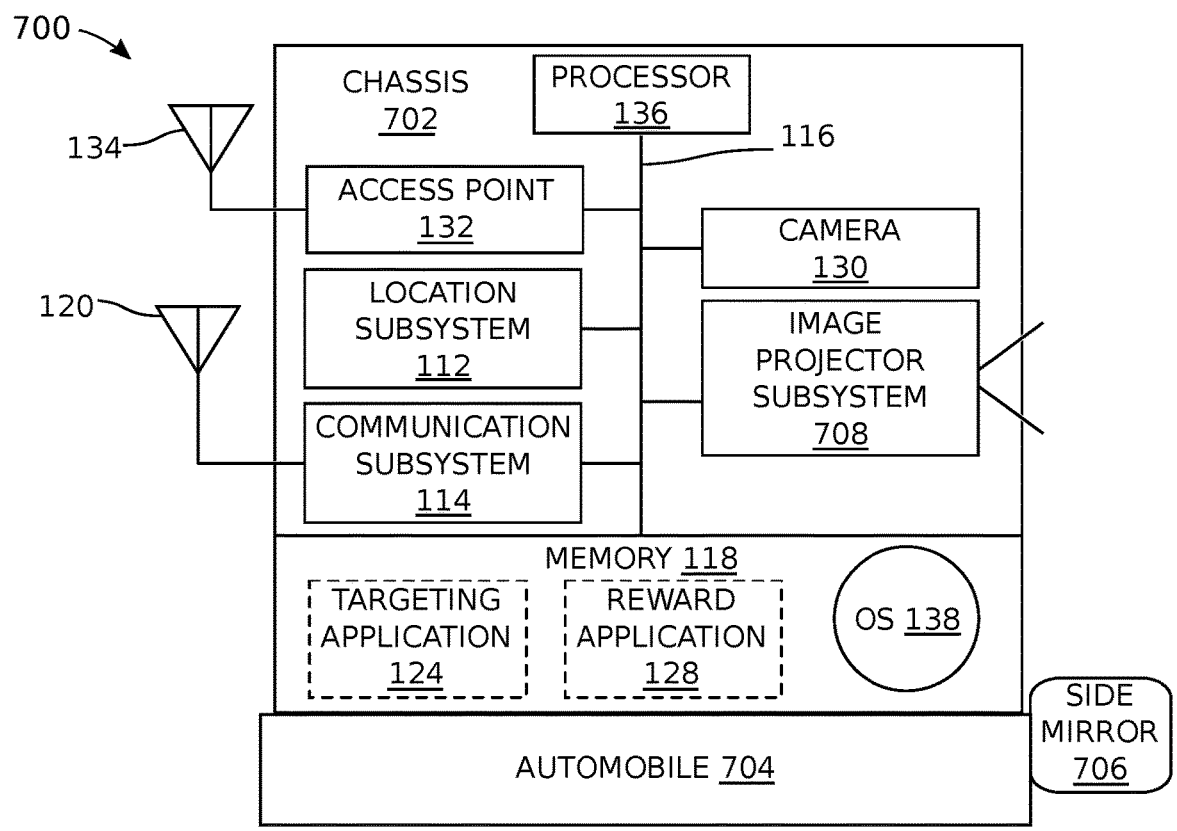

FIGS. 7A and 7B are, respectively, perspective and schematic block diagrams depicting a variation of the mobile media projector system. This system 700 comprises a chassis 702 (as described above), configured for attachment to a roof of an automobile 704, having a side mirror 706. An imaging projector subsystem 708, including projector 208, is selectively engageable to project an image (projected media message) on the side mirror 706, with the image being reflected by the side mirror. The image can be reflected, for example, on a vertical exterior surface of the automobile (e.g., door) as shown, a sidewalk located adjacent to the automobile, or a wall located adjacent to the automobile. In some aspects, if the imaging surface is a dark color or a rough surface, a portable screen may be temporarily attached to the surface. For example, in the case of a car door imaging surface, a magnetic screen could be temporarily applied to the door, or the screen could be hung from the top of the door or clamped by the window.

In common with the system of FIG. 1, system 700 may include a location subsystem 112, configured for attachment to the chassis, to determine a geographic location of the chassis. The system 700 may include a communications subsystem 114, configured for attachment to the chassis, having an interface to receive verification information including an enablement signal generated when the automobile is stationary in a geographic location. Further, the system 700 may include a targeting subsystem enabled as a sequence of processor executable instructions, stored in local memory 118 or a server, for determining the stationary geographic location from a plurality of stationary geographic locations, each having a weighted value that may be rewards. Optionally included is the reward subsystem 128 (e.g., a software application) which may be stored in local memory or a server memory. Further, the system 700 may include an access point 132 and camera 130, as described above. In the interest of brevity, details of these subsystems are not repeated here, but rather, can be found in the explanation of FIG. 1, above.

Figure 8A:
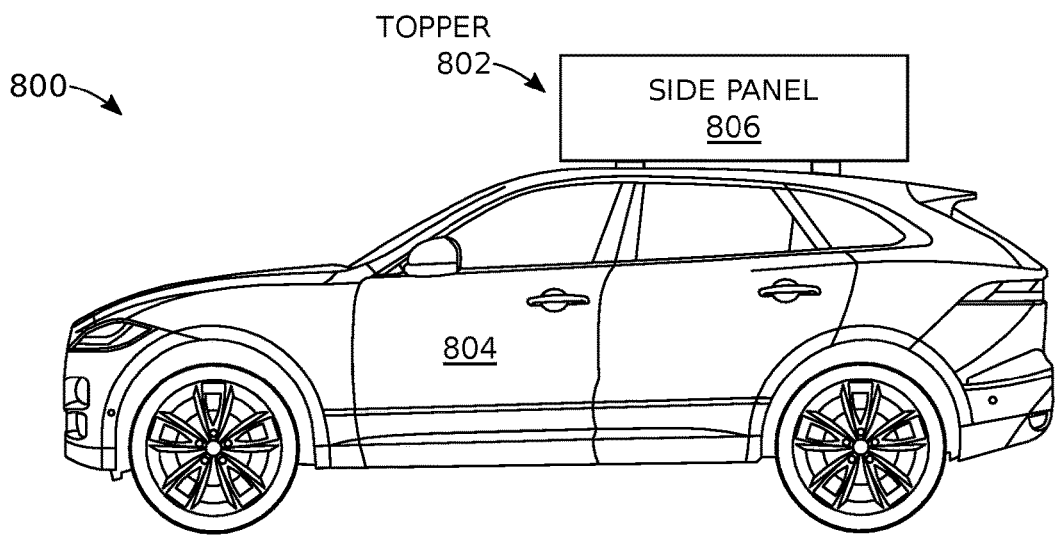
FIGS. 8A and 8B are, respectively, perspective and schematic block diagrams of a mobile communications system.
Figure 8B:
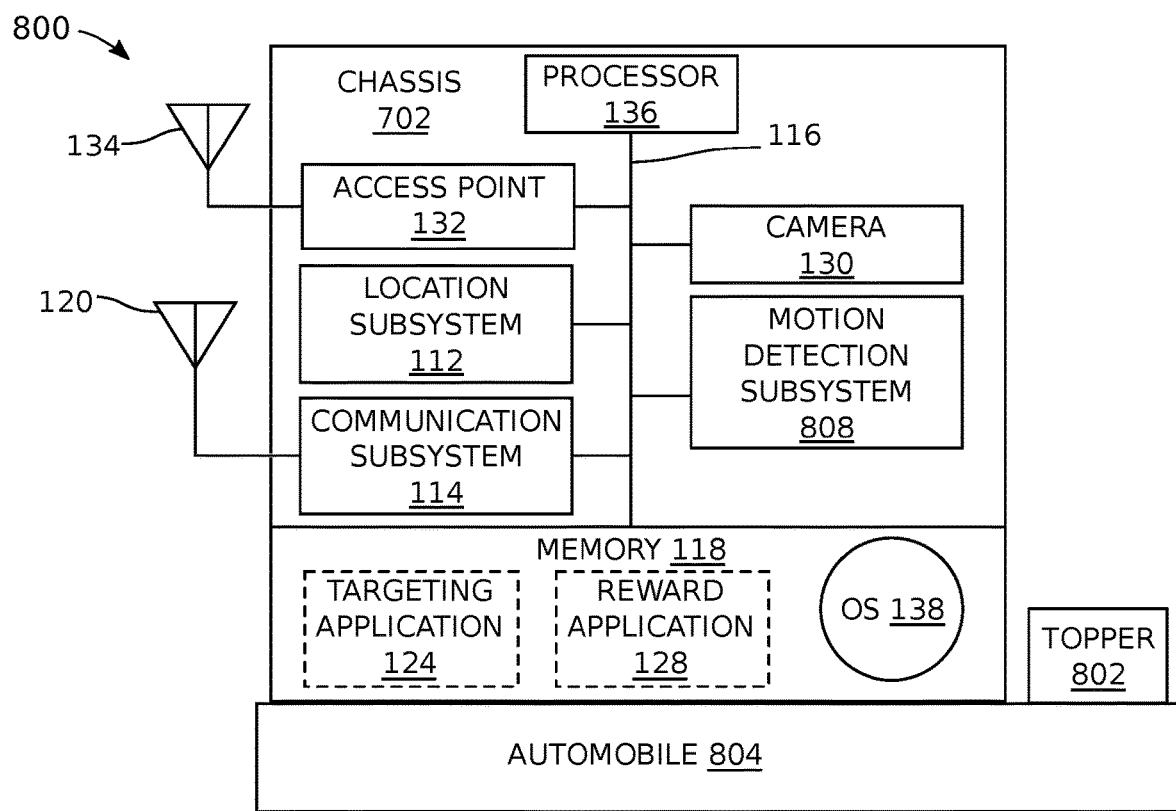

FIGS. 8A and 8B are, respectively, perspective and schematic block diagrams of a mobile communications system. The system 800 comprises a media projection topper 802, configured for attachment to a roof of the vehicle 804, having display side panels 806 to project media. A topper is typically a narrow width rectangular box, with the narrow width facing (orthogonal to) a vehicle's front and rear ends. The rectangular box length is formed by vertically oriented side panels parallel to the vehicle doors. Media messages are formed on the side panels. Typically the side panels are backlit so the media messages can be seen at night. Toppers are often used for advertising, as mounted on taxis or commercial automobiles.

The system 800 also comprises a motion detection subsystem 808, configured for attachment to the media projection topper 802, to determine when the vehicle is stationary in a geographic location, and to determine the duration of time associated with each stationary location. A communications subsystem 114, configured for attachment to the media projection topper 802, has an interface on line 116 to receive verification information including the determined duration of time when the vehicle is stationary.

As in the system of FIG. 1, system 800 may comprise a location subsystem 112, configured for attachment to the media projection topper 802, to determine a geographic location of the vehicle. A communications subsystem 114 may accept verification information including the geographic location. As in system 100 above, the communications subsystem may store the verification information in local memory. Alternatively, the communications subsystem is a wireless transceiver transmitting the verification information to a central controller server 122 (see FIG. 6). In one aspect, the motion detection subsystem 808 is the location subsystem 112. Details of the location subsystem 112, communication subsystem 114, and server 122 have been presented above, and are not repeated here in the interest of brevity.

Otherwise, the motion detection subsystem 808 may be an Inertia Measurements Unit (IMU). An IMU may take the form of accelerometers aligned in 3 orthogonal axes, gyroscopes, magnetometers, or a combination of these devices. Inertial Measurement Units, also called inertial motion units, are devices that facilitate continuous computation of the orientation of the objects to which they are attached. IMUs typically have multiple single- or multi-axis sensors, such as gyroscopes, accelerometers, and magnetometers. Ideally, the accelerometer and magnetometer respectively measure the field strength of the local gravitational and magnetic fields produced by a reference object, such as Earth, and in turn produce sensor field strength readings. The gyroscope measures the rotational speed of the sensor relative to itself, producing a sensor rotational speed reading. The sensor field strength and rotational speed readings may be used singularly or in combination to compute the orientation of the IMU and its associated objects relative to the reference object (vehicle or topper). Further, the IMU may be paired with software applications for estimating variables, such as wind and other weather-related occurrences whose effects impact precisely detecting motion.

In one aspect, the system 800 may comprise a targeting subsystem 124 that may be a software application stored in a non-transitory memory and enabled as a sequence of processor executable instructions for selecting the geographic location from a plurality of stationary geographic locations, each having a weighted value. The targeting application may be stored in local memory 118 (as shown in phantom), or in server memory 126. The system 800 may further comprise a reward subsystem 128 that may be a software application stored in a non-transitory memory and enabled as a sequence of processor executable instructions for determining a reward in response to the determined durations of display time. In some aspects, the rewards are also responsive to the stationary geographic location weighted value. The reward application 128 may be stored in local memory 118 (as shown in phantom), or in server memory 126. Further, the system 800 may include an access point 132.

In another aspect, the system 800 comprises a camera 130, configured for attachment to the topper 802, having an output on line 810 to supply images of a geographic location proximate to the topper. The communications subsystem 114 accepts the camera images and either stores them in local memory 118 for later recovery, or transmits them to the server 122 for storage in memory 126. In the interest of brevity, details of these subsystems are not repeated here, but rather, can be found in the explanation of FIG. 1, above.

Figure 9:
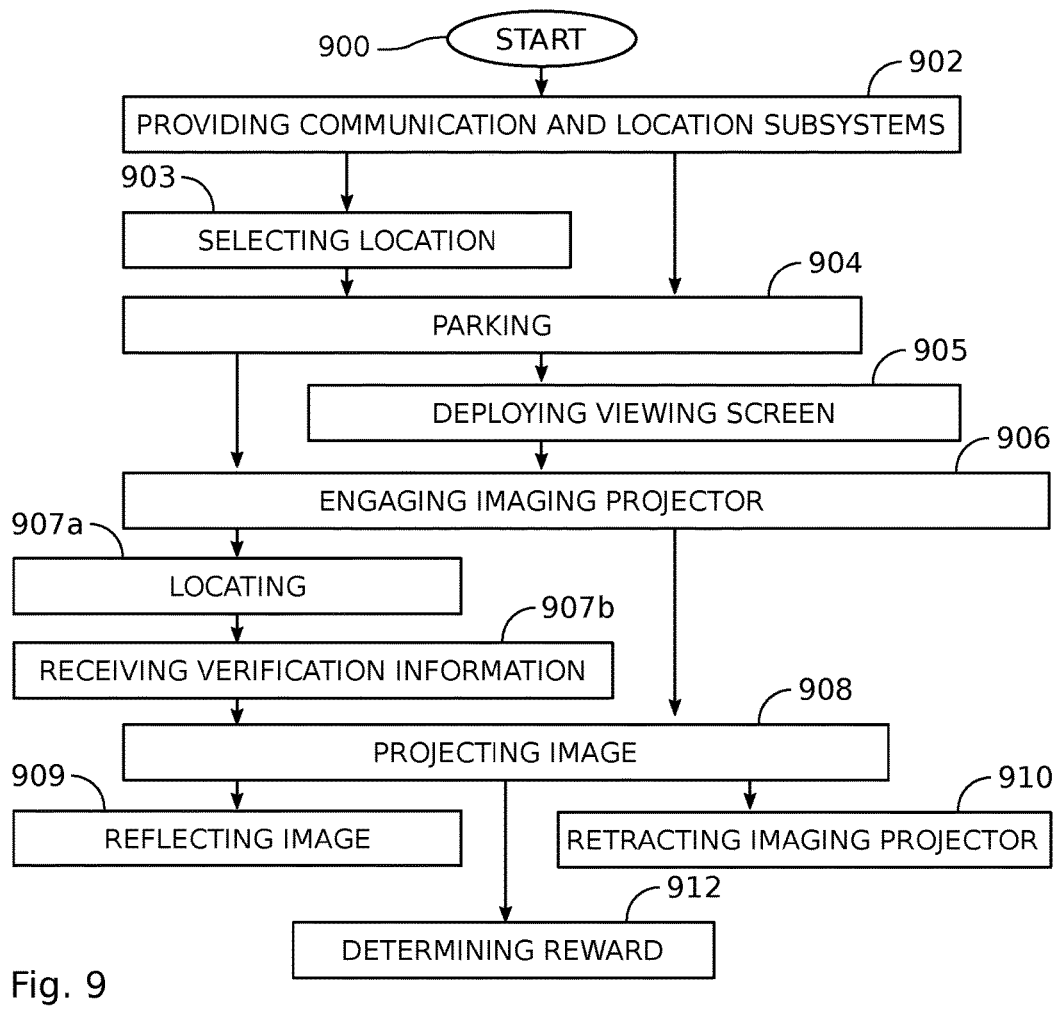
FIG. 9 is a flowchart illustrating a mobile media projector method.

FIG. 9 is a flowchart illustrating a mobile media projector method. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method steps are supported by the above system descriptions and, generally, the method follows the numeric order of the depicted steps. The method starts at Step 900.

Step 902 provides a chassis, configured for attachment to a mobile platform, comprising an imaging projector. Some examples of an imaging projector include LC and LED displays. Step 904 parks the mobile platform. Step 906 selectively engages the imaging projector. Step 908 projects an image. In a first variation, the chassis of Step 902 includes a viewing screen, and an addition step, Step 905 selectively deploys the viewing screen after the mobile platform is parked in a stationary geographic location. Step 908 then projects the image on the viewing screen. For example, Step 902 may provide the chassis configured for attachment to an automotive vehicle with a roof, and Step 905 deploys the viewing screen over an exterior surface of the automotive vehicle. Optionally, after disengaging the imaging projector, Step 910 retracts the imaging projector away from the roof edge.

To continue the first variation example, Step 902 may provide an imaging projector that extends over an automotive vehicle roof edge, with a viewing screen comprising a lower section and an upper section to receive the projected image. The viewing screen lower section may display a fixed, non-transitory image and the viewing screen upper section displays a projected transitory active image.

In one aspect, Step 902 provides location and communications subsystems and Step 906 creates an enablement signal when the imaging projector is engaged. Step 907a locates the geographic location of the chassis (or vehicle). In Step 907b the communications subsystem receives verification information including the imaging projector enablement signal and the geographic location for either storage in local memory or for transmission to a central controlling entity.

In one aspect, Step 903 selects a geographic location from a plurality of stationary geographic locations, each having a weighted value, and Step 912 determines a reward in response to the stationary geographic location weighted value. In a different aspect, Step 902 provides a publically accessible access point, using WLAN device, WPAN, or both WLAN and WPAN devices.

In a second variation, Step 902 provides the chassis configured for attachment to a roof of an automobile having a side mirror. Then, Step 908 projects the image on the side mirror and in Step 909 the image is reflected by the side mirror. For example, the image may be reflected onto a surface such as a vertical exterior surface of the automobile, a sidewalk located adjacent to the automobile, or a wall located adjacent to the automobile. In a third variation Step 908 projects the image on an adjacent vertical wall, so as to create a wallscape.

Figure 10:
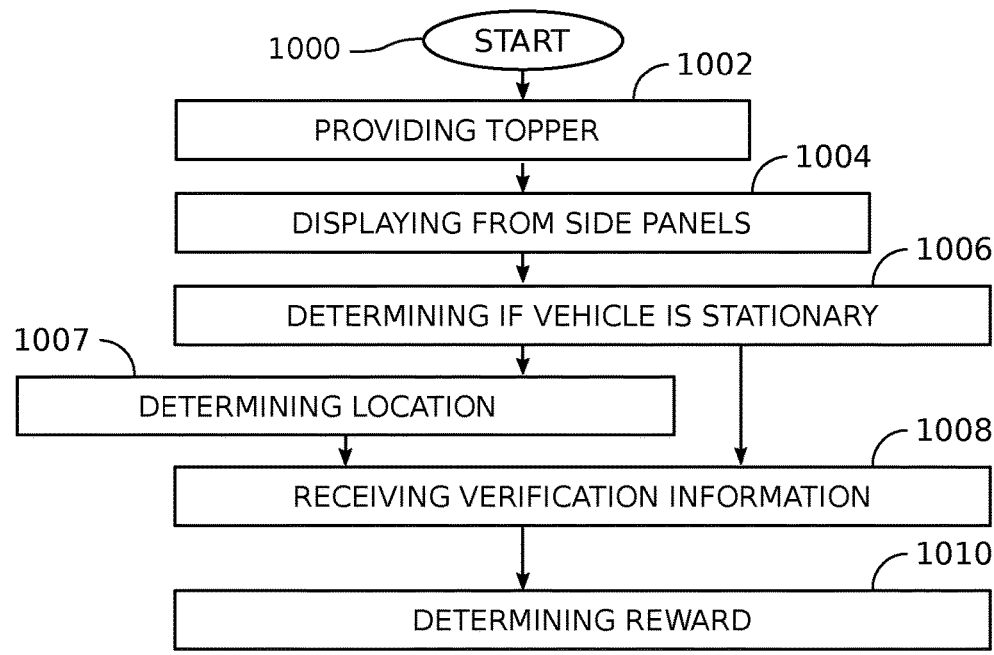
FIG. 10 is a flowchart illustrating a mobile communications method.

FIG. 10 is a flowchart illustrating a mobile communications method. The method begins at Step 1000. Step 1002 provides a media projection topper, configured for attachment to a roof of the vehicle, having side panels. Also provided are motion detection and communications subsystems. Step 1004 displays media from the side panels. Typically, the side panel display is always "on". That is, the display is typically not selectively engaged. Step 1006 determines when the vehicle is stationary in a geographic location, and also measures the duration of each stationary occurrence. In addition to detecting parking, Step 1006 detects short-term stops, such as at stop lights and stop signs. In Step 1008 the communications subsystem receives verification information including the duration measurements when the vehicle is stationary, which is stored in local memory or transmitted to a central controller. In one aspect, Step 1002 provides a location subsystem. Then, Step 1007 determines a geographic location of the vehicle that is passed to the communications subsystem in Step 1008.

In another aspect, Step 1007 determines a stationary geographic location from a plurality of stationary geographic locations, each having a weighted value. Step 1010 determines a reward that is also in response to the stationary geographic location weighted value.

Figure 11A:
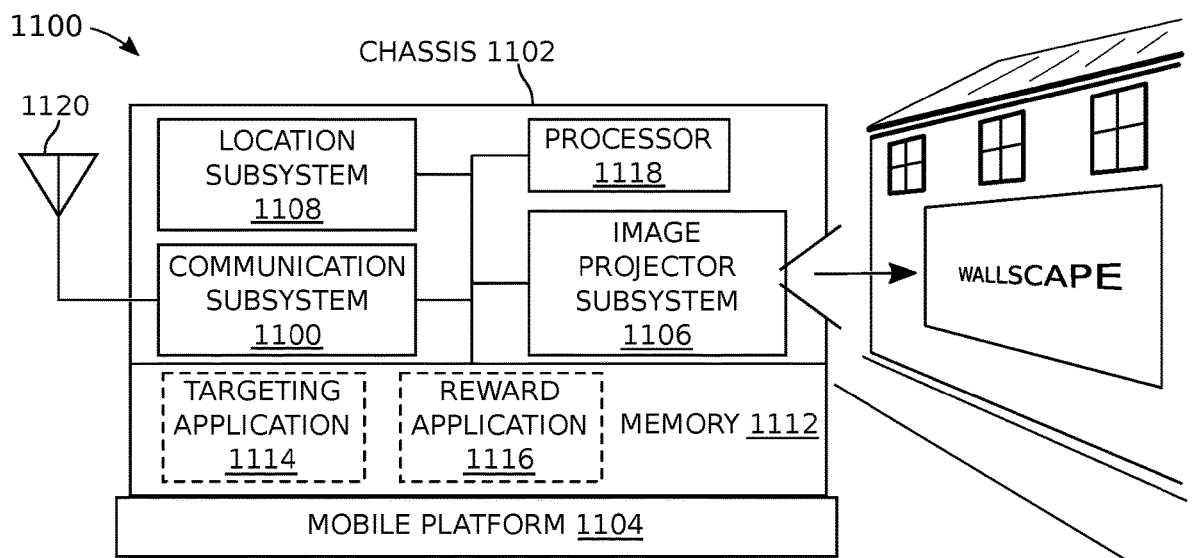
FIGS. 11A and 11B are, respectively, a schematic block diagram and perspective view of a mobile wallscape projector system.
Figure 11B:
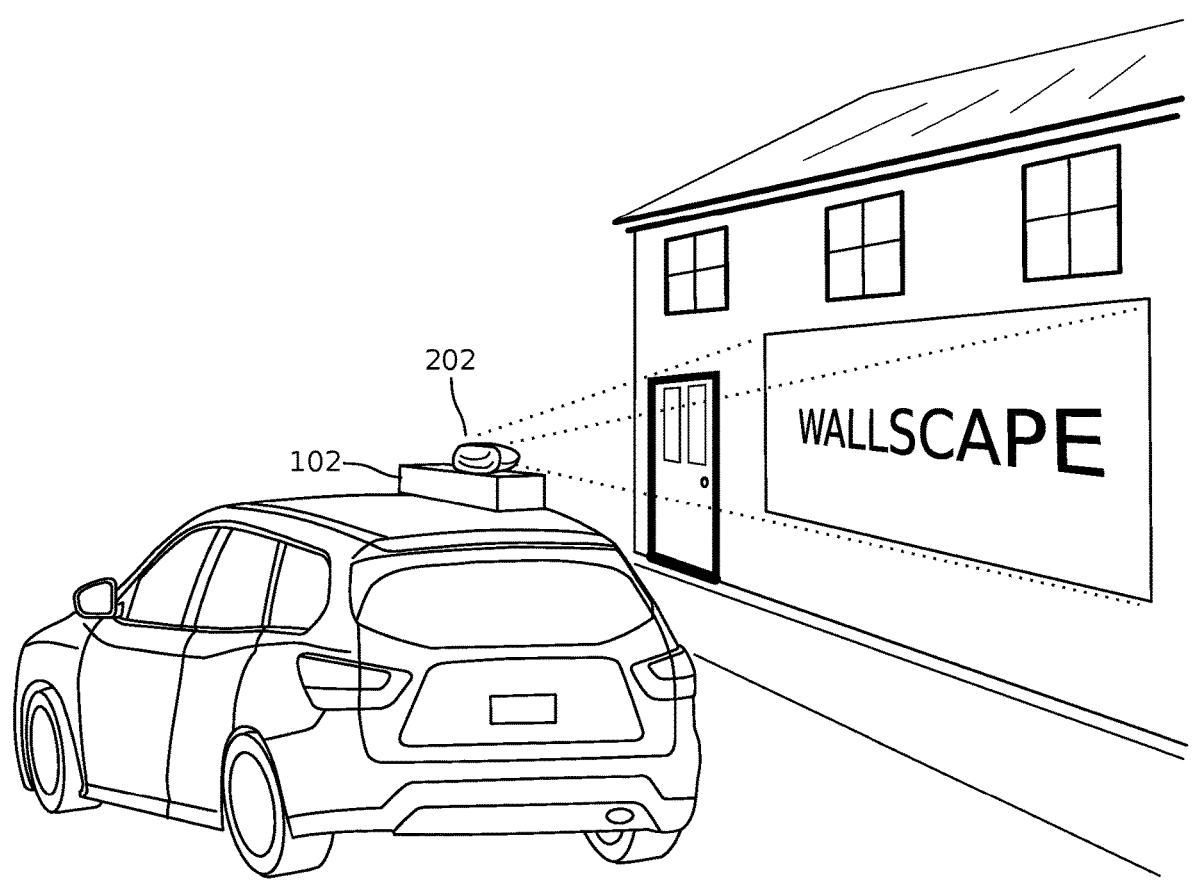

FIGS. 11A and 11B are, respectively, a schematic block diagram and perspective view of a mobile wallscape projector system. The system 1100 comprises a chassis 1102, configured for attachment to a mobile platform 1104. An imaging projector subsystem 1106 is configured for attachment to the chassis 1102, and is selectively engageable to project an image on an adjacent vertical wall surface when the mobile platform 1104 is parked in a stationary geographic location. A location subsystem 1108 is configured for attachment to the chassis 1102 to determine the geographic location of the mobile platform 1104. A communications subsystem 1110 accepts verification information including the geographic location, which information is stored in local memory 1112 for subsequent recovery or transmitted to a central control server (not shown). The system 1100 also includes a targeting subsystem 1114 for selecting the geographic location from a plurality of stationary geographic locations, each having a weighted value. Here, the targeting subsystem 1114 is shown as a software application stored in local memory 1112, but alternative, it may be stored in a communicating server (not shown). A reward subsystem 1116 determines a reward in response to the stationary geographic location weighted value. Here, the reward subsystem 1116 is shown as a software application stored in local memory 1112, but alternative, it may be stored in a communicating server (not shown). Processor 1118 and antenna 1120 are also shown. Not shown is an optional camera or access point, as explained in the systems above.

Systems and methods have been provided for mobile imaging projector systems with the optional publically accessible access points. Examples of particular message structures, schematic block linkages, and hardware units have been presented to illustrate the invention. However, the invention is not limited to merely these examples. Other variations and embodiments of the invention will occur to those skilled in the art.

We claim:
1. A mobile wallscape projector system comprising:
a chassis, configured for attachment to a mobile platform;
an imaging projector subsystem, configured for attachment to the chassis, to project an image on an adjacent vertical wall surface when the mobile platform is parked in a stationary geographic location;

a targeting subsystem for selecting stationary geographic parking locations from a plurality of stationary geographic parking locations, each having a weighted value:

a location subsystem, configured for attachment to the chassis, to determine the stationary geographic parking location of the mobile platform;

a communications subsystem accepting verification information including the stationary geographic parking location; and, a reward subsystem for determining a reward in response to the stationary geographic parking location weighted value.

2. The system of claim 1 wherein the communications subsystem is a wireless transceiver transmitting the verification information.

3. The system of claim 1 further comprising:
a camera having an output to supply images of a geographic location proximate to the media projection topper; and,
wherein the communications subsystem accepts the camera images.

4. The system of claim 1 wherein the imaging projector subsystem is selectively enabled.

5. The system of claim 1 further comprising:
a publically accessible access point selected from the group consisting of a wireless local area network (WLAN), wireless personal area network (WPAN), and both WLAN and WPAN devices.

6. The system of claim 1 wherein the targeting subsystem is a software application stored in a non-transitory memory and enabled as a sequence of processor executable instructions for selecting the stationary geographic parking location.

7. The system of claim 6 wherein the memory is embedded in a device selected from the group consisting of a mobile wallscape projection system local memory or a server memory.

8. The system of claim 1 wherein the communications subsystem receives media uploads from a server, and supplies the media uploads to the imaging projector subsystem for presentation.

9. The system of claim 1 wherein the imaging projector subsystem comprises an element selected from the group consisting of a liquid crystal (LC) display, light emitting diode (LED) display, mercury arc lamp, xenon arc lamp, cathode ray tube (CRT), digital light processing (DLP) display, plasma display, silicon X-tal reflective display (SXRD), and red-green-blue (RGB) lasers.

* * * * *